United States Patent
Kuczynski

(10) Patent No.: US 9,613,724 B2
(45) Date of Patent: Apr. 4, 2017

(54) NUCLEAR FUEL PROVIDED WITH A COATING

(75) Inventor: Leszek Andrzej Kuczynski, Garsfontein (ZA)

(73) Assignee: Pebble Bed Modular Reactor (Proprietary) Limited (ZA)

( * ) Notice: Subject to any disclaimer, the term of this patent is extended or adjusted under 35 U.S.C. 154(b) by 2354 days.

(21) Appl. No.: 11/631,245

(22) PCT Filed: Mar. 1, 2005

(86) PCT No.: PCT/IB2005/050738
§ 371 (c)(1),
(2), (4) Date: Nov. 26, 2008

(87) PCT Pub. No.: WO2005/088646
PCT Pub. Date: Sep. 22, 2005

(65) Prior Publication Data
US 2009/0080591 A1    Mar. 26, 2009

(30) Foreign Application Priority Data
Mar. 1, 2004   (ZA) .................................. 2004/1667

(51) Int. Cl.
  *G21C 3/00*  (2006.01)
  *G21C 3/17*  (2006.01)
  *G21C 3/20*  (2006.01)

(52) U.S. Cl.
  CPC ................ *G21C 3/17* (2013.01); *G21C 3/20* (2013.01); *G21Y 2002/101* (2013.01);
  (Continued)

(58) Field of Classification Search
  CPC . G21C 21/02; G21C 3/02; G21C 3/04; G21C 3/07; G21C 3/18; G21C 3/16; G21C 3/17; G21C 3/20; G21C 3/32; G21C 3/041; G21C 3/58; G21C 3/60; G21C 3/62; G21C 3/64; G21C 3/621; G21C 3/623;
  (Continued)

(56) References Cited

U.S. PATENT DOCUMENTS 3,122,595 A     2/1964 Oxley
3,166,614 A *   1/1965 Taylor ............................ 264/0.5
(Continued)

FOREIGN PATENT DOCUMENTS

EP   0 317 774 A2   5/1989
EP   1 010 183 B1   9/2003
(Continued)

OTHER PUBLICATIONS

Ersoy et al., Carbon coatings produced by high temperature chlorination of silicon carbide ceramics, Apr. 24, 2001, Springer-Verlag, Mat Res Innovat (2001), 5:55-62.*

(Continued)

*Primary Examiner* — Marshall O'Connor
(74) *Attorney, Agent, or Firm* — Morriss O'Bryant Compagni

(57) ABSTRACT

This invention relates to a method of preparing a nuclear fuel including the step of depositing a coating which includes fluorine, or at least one compound thereof, around a kernel (12) of fissile material. The invention extends to a coated nuclear fuel particle (10).

13 Claims, 1 Drawing Sheet

(52) U.S. Cl.
CPC .. *G21Y 2002/104* (2013.01); *G21Y 2002/206* (2013.01); *G21Y 2002/303* (2013.01); *G21Y 2002/304* (2013.01); *G21Y 2004/10* (2013.01); *G21Y 2004/303* (2013.01); *Y02E 30/40* (2013.01)

(58) Field of Classification Search
CPC .. G21C 3/626; G21Y 2002/201; Y02E 30/38; C04B 41/009; C01B 33/02; B01J 2208/00132; B01J 2208/00194
USPC ........ 376/409, 411, 412, 414, 416; 427/5, 6; 423/348; 976/DIG. 97
See application file for complete search history.

(56) References Cited

U.S. PATENT DOCUMENTS

| | | | |
|---|---|---|---|
| 3,361,638 A | | 1/1968 | Bokros |
| 3,472,734 A | * | 10/1969 | Boettcher ................. 376/413 |
| 3,697,436 A | * | 10/1972 | Coppinger et al. .......... 252/641 |
| 3,798,123 A | | 3/1974 | Lindemer |
| 3,833,470 A | * | 9/1974 | Gyarmati et al. ............ 376/426 |
| 3,925,577 A | * | 12/1975 | Fatzer et al. ............. 427/249.16 |
| 3,945,884 A | * | 3/1976 | Freck ........................... 376/411 |
| 4,338,380 A | * | 7/1982 | Erickson et al. ............. 428/594 |
| 4,597,936 A | | 7/1986 | Kaae |
| 4,623,400 A | * | 11/1986 | Japka et al. ................... 148/283 |
| 4,755,138 A | * | 7/1988 | Owen et al. .................... 432/58 |
| 4,758,451 A | * | 7/1988 | van den berg et al. . 427/249.15 |
| 4,978,480 A | | 12/1990 | Stansfield et al. |
| 4,992,298 A | * | 2/1991 | Deutchman et al. ......... 427/524 |
| 5,094,804 A | | 3/1992 | Schweitzer |
| 5,192,495 A | | 3/1993 | Caldwell et al. |
| 5,227,129 A | * | 7/1993 | Bryan et al. ................... 376/414 |
| 5,434,896 A | * | 7/1995 | Bryan et al. ................... 376/414 |
| 5,498,442 A | * | 3/1996 | Lennartz ............................ 427/6 |
| 5,855,678 A | * | 1/1999 | Sanjurjo et al. .............. 118/715 |
| 5,978,432 A | * | 11/1999 | Kim et al. ..................... 376/261 |
| 6,190,725 B1 | * | 2/2001 | Lee et al. ........................... 427/6 |
| 2001/0047980 A1 | * | 12/2001 | McNallan et al. .............. 216/75 |

FOREIGN PATENT DOCUMENTS

| | | | |
|---|---|---|---|
| GB | 1031154 | 5/1966 | |
| GB | 1185637 | 3/1970 | |
| JP | 06186369 | 7/1994 | |
| JP | 06186369 A | * 7/1994 | ............... G21C 3/62 |

OTHER PUBLICATIONS

Ersoy et al (Carbon Coatings Produced by High Temperature Chlorination of Silicon Carbide Ceramics, Mat Res Innovat (2001) 5:55-62).*

* cited by examiner

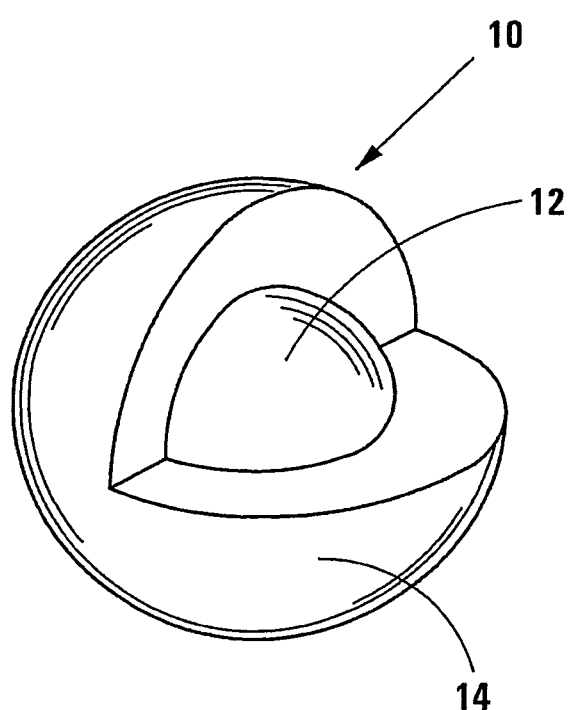

NUCLEAR FUEL PROVIDED WITH A COATING

CROSS-REFERENCE TO RELATED APPLICATIONS

This application is a National Stage under 35 U.S.C. §371 of International Application No. PCT/IB2005/050738, filed Mar. 1, 2005, which claims the benefit of South African Patent Application No. 2004/1667, filed Mar. 1, 2004, the entirety of each of which is incorporated by reference.

BACKGROUND OF THE INVENTION

Field of the Invention

This invention relates to nuclear fuel. More particularly, the invention relates to a method of preparing a nuclear fuel, to a nuclear fuel particle and to a nuclear fuel element.

Description of Related Art

In a nuclear reactor of the high temperature gas-cooled type, use is made of fuel comprising a plurality of spherical fuel elements. The fuel elements include a core comprising fuel particles, each having a kernel of fissile material, dispersed in a matrix. The spherical fuel elements are known as pebbles and the nuclear reactor of this type is generally known as a pebble bed reactor.

BRIEF SUMMARY OF THE INVENTION

According to one aspect of the invention, there is provided a method of preparing a nuclear fuel, which method includes the step of depositing a coating which includes fluorine, or at least one compound thereof, around a kernel of fissile material.

More particularly, the method may include depositing a mixture of silicon and silicon carbide around a kernel of fissile material followed by fluorinating the silicon and silicon carbide.

The method may include the step of introducing magnesium into the fluorinated silicon and silicon carbide around the kernel.

The method may include the prior step of depositing silicon-nitride-bonded-silicon-carbide around the kernel of fissile material.

Depositing the silicon-nitride-bonded-silicon-carbide may include the steps of depositing a mixture comprising silicon and silicon carbide around the kernel and nitriding the silicon and silicon carbide mixture.

By "nitriding" is to be understood treating the nuclear fuel particle in an atmosphere capable of supplying nitrogen to a surface of the fuel particle kernel such that nitrogen diffuses into the surface and combines with nitride-forming elements therein.

Depositing the silicon-nitride-bonded-silicon-carbide may include the further step of introducing carbon into the nitrided silicon and silicon carbide mixture.

The method may include the step of depositing diamond around the kernel. Depositing the diamond may include depositing silicon carbide around the kernel and at least partly reducing the silicon carbide to carbon, more particularly, to the carbon allotrope of diamond. Preferably, the silicon carbide deposited will be beta polytype silicon carbide. Reducing the silicon carbide may include reacting the silicon carbide with hydrogen chloride or chlorine. Naturally, however, any other suitable reducing agent may be used.

Preferably, the method includes the steps of, during a continuous process and whilst maintaining a temperature of between about 1 300 degrees Celsius and about 1 950 degrees Celsius, in sequence, depositing stoichiometric beta polytype silicon carbide followed by a mixture of silicon and silicon carbide around the kernel of fissile material, nitriding the silicon and silicon carbide mixture, introducing carbon into the nitrided silicon and silicon carbide mixture, depositing a further amount of mixture of silicon and silicon carbide, fluorinating the further amount of silicon and silicon carbide mixture, and optionally introducing magnesium into the fluorinated silicon and silicon carbide mixture. The method may include the further step of thereafter, during the continuous process and whilst maintaining the temperature, depositing stoichiometric silicon carbide and reducing the silicon carbide at least partly to diamond by reacting the silicon carbide with chlorine or other suitable reducing agent.

According to another aspect of the invention, there is provided a method of preparing a nuclear fuel, which method includes the step of providing a composite coating comprising at least two elements or compounds selected from the group consisting of fluorine or derivatives thereof, silicon nitride, silicon carbide and magnesium around a kernel of a fissile material.

The composite coating may have a thickness of between about 6 micrometers and about 120 micrometers, preferably about 60 micrometers.

According to still another aspect of the invention, there is provided a method of preparing a nuclear fuel, which method includes the step of depositing by chemical vapor deposition techniques a coating which includes magnesium, or at least one compound thereof, around a kernel of a fissile material.

The method may be conducted at a temperature of between about 1 300 degrees Celsius and about 1 950 degrees Celsius. The method may be carried out at a pressure of between about 0.4 kPa and about 10 kPa, preferably about 1.6 kPa.

The method may include the prior step of forming a plurality of nuclear fuel particle kernels by atomising a uranyl nitrate solution to form microparticles, followed by baking the microparticles at high temperature to provide a kernel of fissile material. Typically the particles are about 0.5 mm in diameter.

According to yet another aspect of the invention, there is provided a coated nuclear fuel particle, which includes a kernel of a fissile material and a coating which includes fluorine, or at least one compound thereof, deposited around the kernel.

According to a further aspect of the invention, there is provided a coated nuclear fuel particle, which includes a kernel of a fissile material and a composite coating comprising at least two elements or compounds selected from the group consisting of fluorine or derivatives thereof, silicon nitride, silicon carbide and magnesium deposited around the kernel.

The kernel may be of size about 500 micrometers. The kernel may be of uranium dioxide.

The composite coating may have a thickness of between about 20 micrometers and about 270 micrometers, preferably about 240 micrometers.

More particularly, the coated nuclear fuel particle may have deposited around the kernel, stoichiometric silicon carbide, silicon nitride bonded silicon carbide, fluorinated mixture of silicon and silicon carbide, optionally impregnated with magnesium, and diamond.

According to a still further aspect of the invention, there is provided a nuclear fuel element which includes a plurality of coated nuclear fuel particles as hereinbefore described dispersed in a matrix.

BRIEF DESCRIPTION OF THE SEVERAL VIEWS OF THE DRAWINGS

In the drawings, which currently illustrate the best mode for carrying out the invention:

FIG. 1 shows a part-sectional perspective view of a coated nuclear fuel particle in accordance with the invention.

DETAILED DESCRIPTION OF THE INVENTION

The invention will now be described, by way of example, with reference to the accompanying diagrammatic drawing and the following Example:

Example 1

A plurality of nuclear fuel particle kernels was formed by atomisation of uranyl nitrate to form microspheres. The microspheres were then gelled and baked at a high temperature, ie. calcinated, to yield uranium dioxide particles, each to provide a kernel of fissile material for a coated nuclear fuel particle.

A plurality of nuclear fuel particle kernels was formed by atomisation of uranyl nitrate to form microspheres. The microspheres were then gelled and baked at a high temperature, ie. calcinated, to yield uranium dioxide particles, each to provide a kernel of fissile material for a coated nuclear fuel particle.

A batch of uranium dioxide particles was suspended in a fluidised bed type deposition chamber of a chemical vapor deposition reactor, the deposition chamber having an argon environment. The deposition chamber was heated to a temperature of approximately 1000 degrees Celsius and all depositions were carried out a pressure of between 1.5 kPa and 1.7 kPa.

First, stoichiometric silicon carbide was deposited on the surface of the uranium dioxide particles to a thickness of at least 4 micrometers. Whilst maintaining the temperature and as this thickness of stoichiometric silicon carbide was attained, the source gases for deposition were switched to methylchlorosilane to deposit a mixture of silicon and silicon carbide around each kernel by the decomposition of the methylchlorosilane.

The silicon and silicon carbide mixture was then nitrided by furnacing in a nitrogen atmosphere at a temperature of 1820 degrees Celsius and a pressure of 1.6 kPa to yield a mixture of silicon carbide and silicon nitride crystals. The fuel particles were treated in the nitrogen atmosphere for 1.5 hours to permit nitrogen to permeate the full depth of the silicon and silicon carbide layer to yield silicon-nitride-bonded-silicon-carbide. The deposition source gases were thereafter switched to carbon-enriched gas and carbon was introduced into yield silicon-nitride-bonded-silicon-carbide to bond to free silicon remaining within the yield silicon-nitride-bonded-silicon-carbide.

Whilst maintaining the temperature, the source gases for deposition were again switched to methylchlorosilane to deposit further mixture of silicon and silicon carbide. The silicon and silicon carbide mixture was fluorinated by the addition of fluorine gas to the methylchlorosilane and the deposition was carried out at a pressure of between 1.5 kPa and 1.7 kPa. While still maintaining the temperature, the fluorine source was disconnected and a magnesium source gas was connected to the inlet end of the deposition chamber thereby to introduce magnesium into the silicon and silicon carbide mixture. Magnesium was introduced for a period of between 30 minutes and 40 minutes in as much as possible to avoid the formation of a magnesium nanolayer.

The source gases for deposition were then switched to deposit further stochiometric silicon carbide to a thickness of at most 9 micrometers around the kernel at a deposition temperature of 1780 degrees Celsius and a deposition pressure of 1.6 kPa. A chlorine (Cl2) source was then connected to an inlet end of the deposition chamber whilst maintaining the temperature between 1020 and 1050 degrees Celsius and the silicon carbide layer was reduced to diamond.

Reference is made to FIG. 1 of the drawings, which shows a part-sectional perspective view of a coated nuclear fuel particle in accordance with the invention. In FIG. 1, reference numeral 10 refers generally to a coated nuclear fuel particle, prepared in accordance with the above Example. The coated fuel particle 10 includes a kernel 12 comprised of a uranium dioxide particle. A coating, generally indicated by reference numeral 14, is deposited on the kernel 12. The coating 14 includes stoichiometric silicon carbide yield silicon-nitride-bonded-silicon-carbide, a fluorinated mixture of silicon and silicon carbide, magnesium and diamond. FIG. 1 is for illustrative purposes only and it is to be appreciated that, as a result of the coating/deposition process being carried out whilst at all times maintaining a high temperature, ie. not permitting the temperature to drop below 1000 degrees Celsius, boundaries between different compounds/materials deposited are not clearly defined such that a composite coating is formed.

Discussion

Preferably the stoichiometric silicon carbide initially deposited will be beta polytype silicon carbide.

The deposition steps of the method of the invention are carried out as part of a continuous process during which the high temperature of deposition is at all times maintained and no intermediate cooling is permitted. A composite layer 14 comprising silicon carbide, silicon nitride, silicon fluoride, magnesium, silicon and carbon is thus deposited on the kernel 12 of fissile material. No nano-layer of magnesium should be formed during the deposition process.

The Applicant believes that the coated nuclear fuel particles 10 of the invention will exhibit improved retention of fission products, particularly of silver and caesium by-products of nuclear fission. It is believed that the diffusion of these contaminants will be greatly reduced for temperatures between 0 and 1850 degrees Celsius. Fluorine, in particular, affords a barrier to diffusion of fission products, is very hard and can withstand high working temperatures.

It is believed that the coated nuclear fuel particles of the invention will exhibit gas tightness and retain gaseous fission products at temperatures of less than 1900 degrees Celsius where the particle burn up is at most 18%.

The invention claimed is:

1. A method of preparing a nuclear fuel, which method includes:
    depositing a mixture of silicon and silicon carbide around a kernel of fissile material by chemical vapour deposition in a fluidised bed deposition chamber of a chemical vapour deposition reactor from a chemical vapour deposition source gas comprising methylchlorosilane which is fed to the deposition chamber, and fluorinating the silicon and silicon carbide with fluorine gas by adding the fluorine gas to the methylchlorosilane which is fed to the deposition chamber.

2. The method as claimed in claim 1, comprising introducing magnesium into the fluorinated silicon and silicon carbide.

3. The method as claimed in claim 1, comprising depositing silicon-nitride-bonded-silicon-carbide around the kernel of fissile material.

4. The method as claimed in claim 3, wherein depositing the silicon-nitride-bonded-silicon-carbide includes the steps of depositing a mixture comprising silicon and silicon carbide around the kernel and nitriding the silicon and silicon carbide mixture.

5. The method as claimed in claim 4, further comprising introducing carbon into the nitrided silicon and silicon carbide mixture.

6. The method as claimed in claim 1, comprising depositing diamond around the kernel.

7. The method as claimed in claim 6, comprising depositing silicon carbide around the kernel and at least partly reducing the silicon carbide to diamond.

8. The method as claimed in claim 7, wherein reducing the silicon carbide includes reacting the silicon carbide with hydrogen chloride or chlorine.

9. The method as claimed in claim 6, in which the silicon carbide is beta polytype silicon carbide.

10. The method as claimed in claim 1, comprising, during a continuous process and whilst maintaining a temperature of between 1,300 degrees Celsius and 1,950 degrees Celsius, in sequence, depositing stoichiometric beta polytype silicon carbide followed by a mixture of silicon and silicon carbide around the kernel of fissile material, nitriding the silicon and silicon carbide mixture, introducing carbon into the nitrided silicon and silicon carbide mixture, depositing a further amount of a mixture of silicon and silicon carbide, and fluorinating the further amount of silicon and silicon carbide mixture.

11. The method as claimed in claim 10, comprising introducing magnesium into the fluorinated silicon and silicon carbide mixture.

12. The method as claimed in claim 10, further comprising, during the continuous process and whilst maintaining the temperature, depositing stoichiometric silicon carbide and reducing the silicon carbide at least partly to diamond by reacting the silicon carbide with chlorine.

13. The method as claimed in claim 1, which includes the prior step of forming a plurality of nuclear fuel particle kernels by atomising a uranyl nitrate solution to form microparticles, followed by calcining the microparticles to provide a kernel of fissile material.

* * * * *